(12) United States Patent
Yamaguchi (10) Patent No.: US 6,454,315 B1
(45) Date of Patent: Sep. 24, 2002

(54) OIL WELL PIPE SCREW JOINT, AND THREADING METHOD AND APPARATUS THEREFOR

(75) Inventor: Masao Yamaguchi, Handa (JP)

(73) Assignee: Kawasaki Steel Corporation, Kobe (JP)

( * ) Notice: Subject to any disclaimer, the term of this patent is extended or adjusted under 35 U.S.C. 154(b) by 0 days.

(21) Appl. No.: 09/508,246

(22) PCT Filed: Jul. 29, 1999

(86) PCT No.: PCT/JP99/04081

§ 371 (c)(1),
(2), (4) Date: Mar. 9, 2000

(87) PCT Pub. No.: WO00/06937

PCT Pub. Date: Feb. 10, 2000

(30) Foreign Application Priority Data

| Jul. 31, 1998 | (JP) | 10-217737 |
| Oct. 27, 1998 | (JP) | 10-305114 |
| Dec. 22, 1998 | (JP) | 10-363730 |

(51) Int. Cl.[7] .............................................. F16L 15/06
(52) U.S. Cl. .................. 285/334; 285/390; 411/411; 411/414; 411/310
(58) Field of Search ................ 285/333, 334, 285/355, 390; 411/411, 414, 309, 310, 311

(56) References Cited

U.S. PATENT DOCUMENTS

| 3,629,887 A | * | 12/1971 | Urbanic | 10/210 |
| 4,084,829 A | * | 4/1978 | Falchle et al. | 279/99 |
| 4,485,511 A | * | 12/1984 | Urbanic | 10/96 |
| 4,600,225 A | * | 7/1986 | Blose | 285/334 |
| 4,762,344 A | * | 8/1988 | Perkins et al. | 285/175 |
| 5,154,452 A | * | 10/1992 | Johnson | 285/333 |
| 5,348,350 A | | 9/1994 | Blose et al. | |
| 5,360,239 A | * | 11/1994 | Klementich | 285/94 |
| 5,462,315 A | * | 10/1995 | Klementich | 285/24 |
| 5,782,503 A | * | 7/1998 | Noel et al. | 285/94 |
| 6,062,777 A | * | 5/2000 | Palyo, III et al. | 408/1 R |
| 6,322,110 B1 | * | 11/2001 | Banker et al. | 285/334 |

FOREIGN PATENT DOCUMENTS

| JP | 60-157583 | 8/1985 |
| JP | 2-281061 | 11/1990 |
| JP | 5-277829 | 10/1993 |
| JP | 6-281059 | 10/1994 |
| JP | 9-119564 | 5/1997 |

* cited by examiner

Primary Examiner—Matthew C. Graham
Assistant Examiner—Bradley King
(74) Attorney, Agent, or Firm—Oliff & Berridge, PLC (57) ABSTRACT

An oil-country-tubular threaded joint can withstand tensile forces, and in addition, other forces such as compression and bending forces, thus producing highly improved characteristics in regard to the prevention of fluid leakage. The oil-country-tubular threaded joint is formed of male screw threads and female screw threads which have a load face whose load flank angles are in a range of −3° to −25°, in which the load flank angles are varied at a position at which the load face is divided in the height direction of the male screw thread into an upper side and a lower side so that an upper load flank angle is smaller than a lower load flank angle by 0.5° to 2.0°. Also, a thread-machining apparatus for the oil-country-tubular threaded joint uses chasers having cutting edges which are shaped so as to correspond to thread shapes for machining screw threads whose flank angles are partly of negative values for the oil-country-tubular threaded joint. In the apparatus, the cutting edges which are to be used from the beginning to the end of thread-machining are arranged on the individual chasers sequentially according to the shape, and the chasers are on one rotational body so as to machine screw threads at a rate of one pitch per rotation of the rotational body. This allows negative screw threads of quality higher than in conventional cases to be cut in a reduced time.

4 Claims, 7 Drawing Sheets

OIL WELL PIPE SCREW JOINT, AND THREADING METHOD AND APPARATUS THEREFOR

TECHNICAL FIELD

The present invention relates to an oil-country-tubular threaded joint, particularly, to an oil-country-tubular threaded joint having highly improved characteristics in regard to the prevention of fluid leakage even in an environment where various forces such as external pressure, tensile forces, compression forces, and bending stresses are exerted thereon. The present invention also relates to a thread-machining method for the oil-country-tubular threaded joint and to a thread-machining apparatus therefor; particularly, the invention relates to a technique of machining and quickly completing female screw threads in the oil-country-tubular threaded joint by using a tool-rotating thread-machining apparatus.

BACKGROUND OF THE TECHNIQUES

Presently, threaded joints are widely used as in techniques for coupling oil-country-tubulars used for research and production relating to natural resources, such as natural gas and crude oil, at depth of thousands of meters. Oil-country-tubulars (which may be simply called "tube") are used in severe environments where high pressures and high loads are exerted. Under these circumstances, threaded joints for the tube are required to have characteristics, for example, to withstand forces such as tensile forces due to the weight of coupled tube in the axial direction, and external pressures, and to be repeatedly usable for dozens of times.

Figure 1:
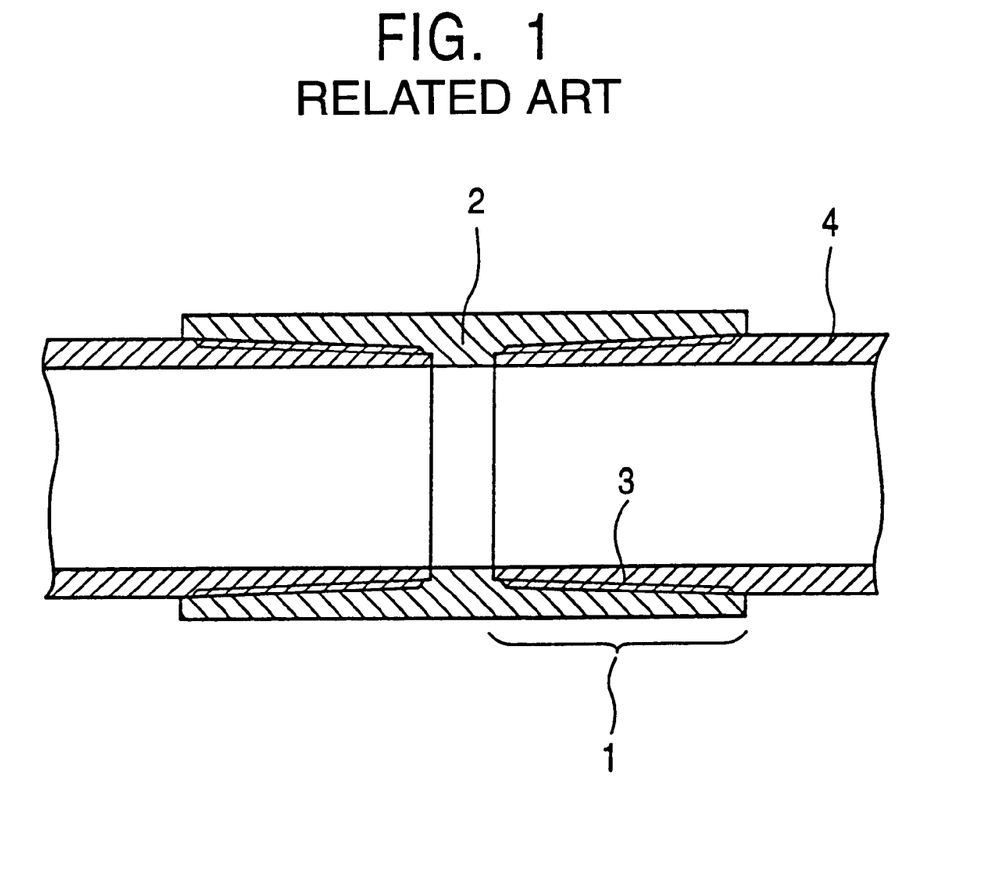
FIG. 1 is a horizontal cross-sectional view of an oil-country-tubular threaded joint of coupling type.

Generally, there are two basic types of oil-country-tubular threaded joints. One is an integral type in which a pin section having male screw threads and a box section having female screw threads are arranged, respectively, on ends of tube, with which the tube are coupled. Another is a coupling type in which, as shown in FIG. 1, a coupling 2 (having male screw threads) having a box section 1 on each end is used to couple tube 4 having a pin section (having male screw threads) at the end.

Figure 2A:
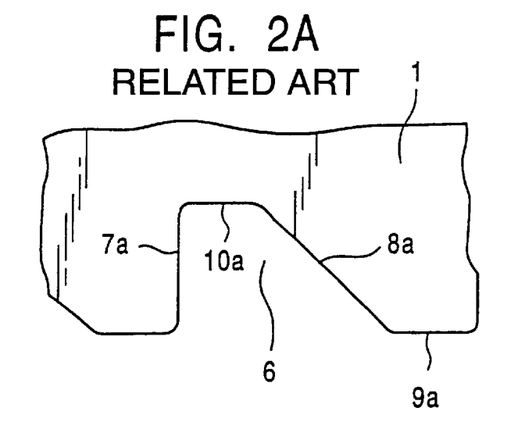
FIG. 2A is a cross-sectional view of a female trapezoidal screw thread.
Figure 2B:
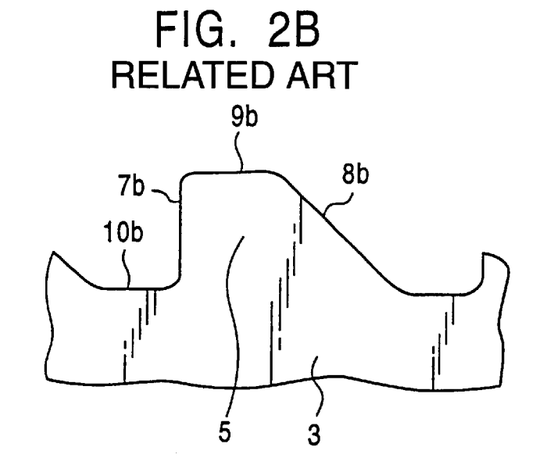
FIG. 2B is a cross-sectional view of a male trapezoidal screw thread.
Figure 2C:
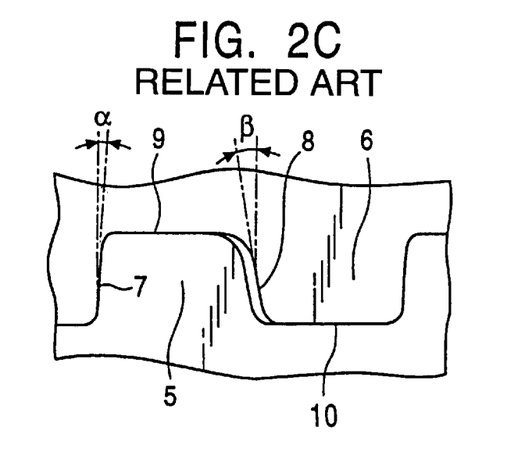
FIG. 2C is a cross-sectional view of engagement of the threads in FIGS. 1 and 2.

For the shape of threads in the threaded joints, trapezoidal screw threads according to the API (American Petroleum Institute) standards are generally used. For example, as shown in FIGS. 2A to 2C, when a male screw thread 5 and a female screw thread 6 are tightened and engaged with each other, a load face 7 is formed of respective load faces 7b and 7a of the male screw thread 5 and the female screw thread 6. Similarly, an insertion face 8 is formed of insertion face 8b and 8a of the male screw thread 5 and the female screw thread 6, and a crest face 9 of a thread is formed of a root face 10d of the female screw thread 6 and a crest face 9b of the male screw thread 5.

In this case, an angle formed by the load face 7 or the insertion face 8 with a line perpendicular to the axis of the casing is referred to a flank angle (the angle on the load face 7 is referred to as a load flank angle α; the angle on the thread insertion face 8 is referred to as a stubbing angle β). These angles are represented by positive or negative numbers (values) For the load flank angle α, counterclockwise angles are represented by negative numbers (values); for the stubbing flank angle, counterclockwise angles are represented by positive numbers (values).

The trapezoidal screw threads according to the API standards are formed with a load flank angle α of 3° and a stubbing flank angle β of 10°. As shown in FIG. 2(c), when the trapezoidal screw threads are tightened, the thread faces contact the load face 7, the thread faces do not contact creating a clearance, and the thread faces contact on at least one of the crest face 9 and the root face 10.

In recent constructions of the oil-country-tubulars 4, compression forces are exerted frequently in the axial direction of the oil-country-tubulars. In this condition, when tensile forces or bending forces impinge on the tube, the API trapezoidal screw threads are apt to be disengaged, possibly causing a problem in that fluid (such as natural gas or crude oil) containing therein leaks outside.

To overcome the above problem, solutions have been proposed. For example, according to Japanese Unexamined Patent Publications Nos. 6-281059 and 6-281061, the load flank angle α of a load face 7 is arranged to be negative for preventing the disengagement of threads. Such screw threads with a negative flank angle are called negative screw threads or hook screw threads.

When a negative load flank angle α is provided, however, the load faces 7b and 7a of the male screw thread 5 and the female screw thread 6 contact firmly, causing stress concentration. This causes damage to corner sections of the treads, which is a cause of leakage of gas or liquid. Under these circumstances, there are increasing demands for threaded joints that can also withstand compression and bending forces.

Figure 3:
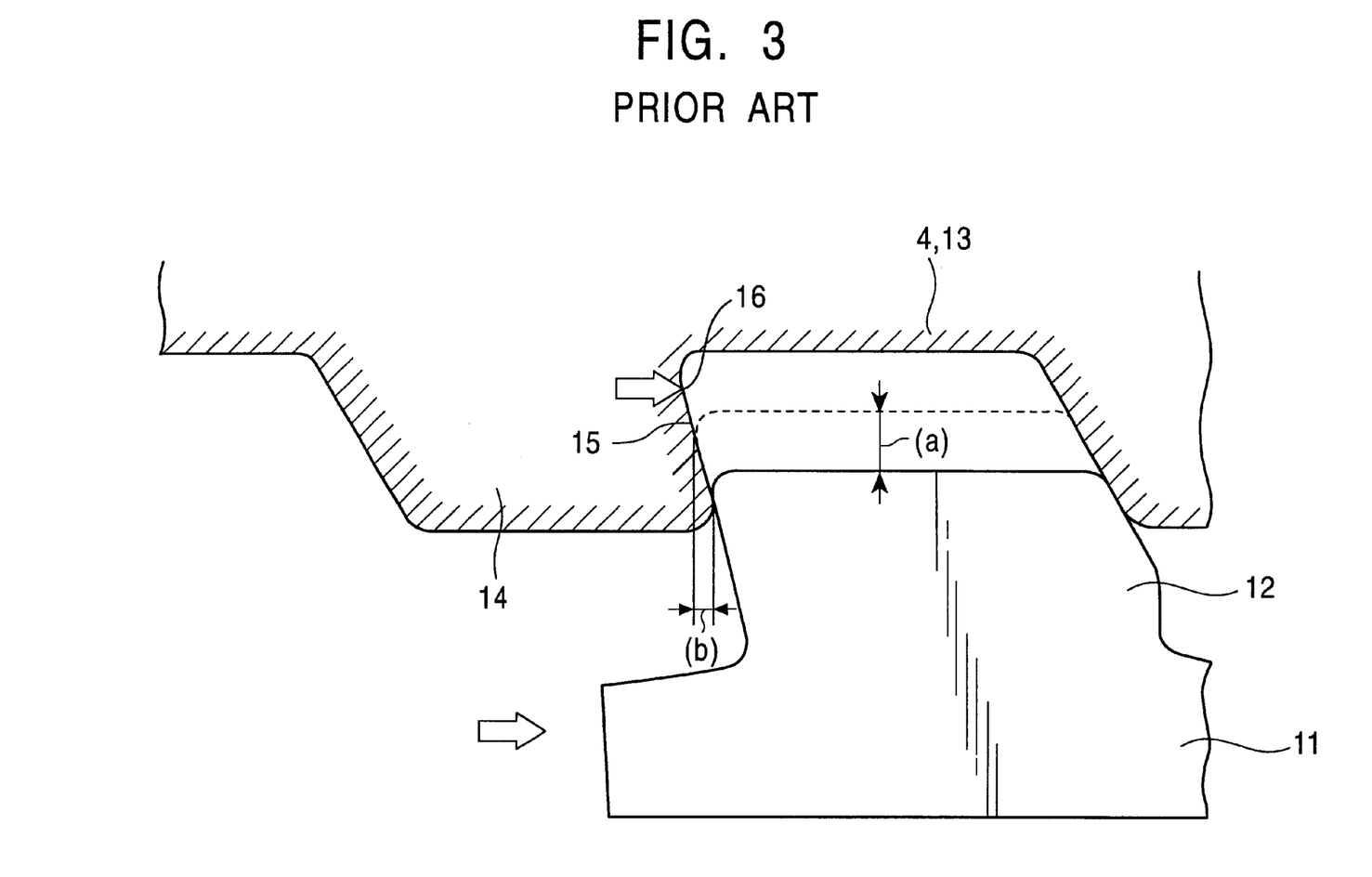
FIG. 3 is illustrative of thread-machining using a chaser of conventional type.

To practically use the negative screw threads, however, many problems still remain. One of the problems relates to the thread-machining technique. Currently, for machining negative screw threads, similarly to the case of a lathe, only a single machining tool (generally called a "chaser") is fitted to a machine. In this case, a tubular body, which is a thread-machining object (which may be called a "work", depending on the case) is rotated, and at the same time, is reciprocated in contact with the chaser. Also, a chaser 11 has a single machining edge, or at most two cutting edges. With this type of chaser, as many as 6 to 12 strokes (expressed also as 6 to 12 passes) of reciprocating operations must be repeated to complete thread-machining. That is, as shown in FIG. 3, since a thread 14 has a negative flank angle 15, each pass requires adjustment of an entering volume A in the radial direction and a movement volume (b) in the axial direction by the negative angle, and also, a machining time longer than for normal cases is required. Furthermore, when the joints produced as described above are used, deformations of a flank face 16 are apt to occur, and the joints are therefore moved by forces, particularly, compression forces and tensile forces, thereby producing a problem in that the joints frequently leak fluid.

DISCLOSURE OF THE INVENTION

In view of the above problems, the present invention provides an oil-country-tubular threaded joint that can withstand tensile forces, and in addition, other forces such as compression and bending forces, thus producing highly improved characteristics in regard to the prevention of fluid leakage. With the oil-country-tubular threaded joint, no damage will be caused to corners of threads while the oil-country-tubulars are being fabricated or are being used.

Also, the present invention provides a thread-machining method and a thread-machining apparatus for the oil-country-tubular threaded joint which allow negative screw threads of a higher quality level than that of conventional cases in reduced time.

To these ends, according to one aspect of the present invention, there is provided an oil-country-tubular threaded joint having male screw threads and female screw threads which have a load face formed of the male screw thread and the female screw thread, which has load flank angles of negative values, in which the load flank angles are varied at a position at which the load face is divided in the height direction of the male screw thread into an upper side and a lower side so that an upper load flank angle is smaller than a lower load flank angle.

Also, there is provided an oil-country-tubular threaded joint having male screw threads and female screw threads which have a load face formed of the male screw thread and the female screw thread, which has load flank angles of negative values, in which the load flank angles of the male screw thread and the female screw thread are different from each other.

Also, according to another aspect of the present invention, there is provided a thread-machining method for the oil-country-tubular, which rotates the rotational body to perform thread-machining by using a plurality of chasers, in which differently shaped cutting edges are arranged on the chasers sequentially, and the chasers are fitted to the rotational body and are used from the beginning to the end of thread-machining in forming screw threads of oil-country-tubulars.

Also, according to still another aspect of the present invention, there is provided a thread-machining apparatus for the oil-country-tubular threaded joint, in which a rotational body has a function to rotate on the central axis, a function to move in the axial direction of the central axis, and a plurality of chasers on which differently shaped cutting edges are arranged sequentially.

BEST MODE FOR CARRYING OUT THE INVENTION

The inventor studied and solved the problems, by inventing the new threaded joints, which is related to the damage of the screw at the threaded joint while oil-country-tubular are being fabricated.

Also, referring back to the thread-machining method, to achieve the objects of the present invention, the inventor endeavored to develop a machining means for negative threads in one pass, and the results are incorporated into the present invention.

According to one aspect of the present invention, there is provided an oil-country-tubular threaded joint having male screw threads and female screw threads which have a load face formed of the male screw thread and the female screw thread, which has load flank angles of negative values, in which the load flank angles are varied at a position at which the load face is divided in the height direction of the male screw thread into an upper side and a lower side so that an upper load flank angle is smaller than a lower load flank angle.

Particularly, the oil-country-tubular threaded joint has a load face formed of the male screw thread and the female screw thread which have load flank angles in a range of −3° to −25°, in which the upper load flank angle is smaller than the lower load flank angle by 0.5° to 2.0°.

Also, there is provided an oil-country-tubular threaded joint having male screw threads and female screw threads which have a load face formed of the male screw thread and the female screw thread, which has load flank angles of negative values, in which the load flank angles of the male screw thread and the female screw thread are different from each other.

Especially, there is provided an oil-country-tubular threaded joint having male screw threads and female screw threads, which has a load face formed of the male screw thread the female screw thread which have load flank angles of −3° to −25°, in which the load flank angles of the male screw thread and the female screw thread are different from each other by 0.1° to 0.75°.

That is, according to the present invention, cutting edges which are shaped so as to correspond to thread shapes and are to be used from the beginning to the end of a thread-machining operation are arranged on the plurality of chasers sequentially, and the chasers are fitted to one rotational body and are used to cut screw threads whose flank angles are partly of negative values for the oil-country-tubular threaded joint at a rate of one pitch per rotation of the rotational body.

Also, the above thread-machining method may have steps in which a central axis of the rotational body is aligned with a central axis of a tubular body; the rotational body is installed such that the end face is perpendicular to the central axis of the tubular body; the cutting edges arranged on the plurality of chasers sequentially are fitted to the rotational body to be directed to the tubular body; the cutting edges are arranged to contact an end section of the tubular body; one of the rotational body and the tubular body is moved in the axial direction; and the rotational body is rotated to allow the cutting edges of different shapes, which are required for completion of thread formation, to cut threads sequentially.

In this case, the number of the chasers used is within a range of three to six, each of the chasers having cutting edges with one to five shapes.

Also, the thread-machining apparatus in the present invention has cutting edges which are shaped so as to correspond to thread shapes for machining screw threads whose flank angles are partly of negative values for the oil-country-tubular threaded joint. The apparatus has an arrangement in which one to five pieces of the cutting edges, which are to be used from the beginning to the end of thread-machining, are arranged on the individual chasers; the rotational body that reciprocates pressing the chasers onto the tubular body, which is a thread-machining object, is provided; and the chaser to be used at the beginning of machining and the chasers to be used thereafter are fitted sequentially onto a concentric circle on the rotational body at identical pitch in the rotational direction so that the cutting edges are arranged in the use order. Furthermore, the thread-machining apparatus has a function to control the diameter of the aforementioned concentric circle.

Hereinbelow, a description will be given of embodiments of the present invention with reference to the drawings.

(1) Threaded Joint

Figure 4:
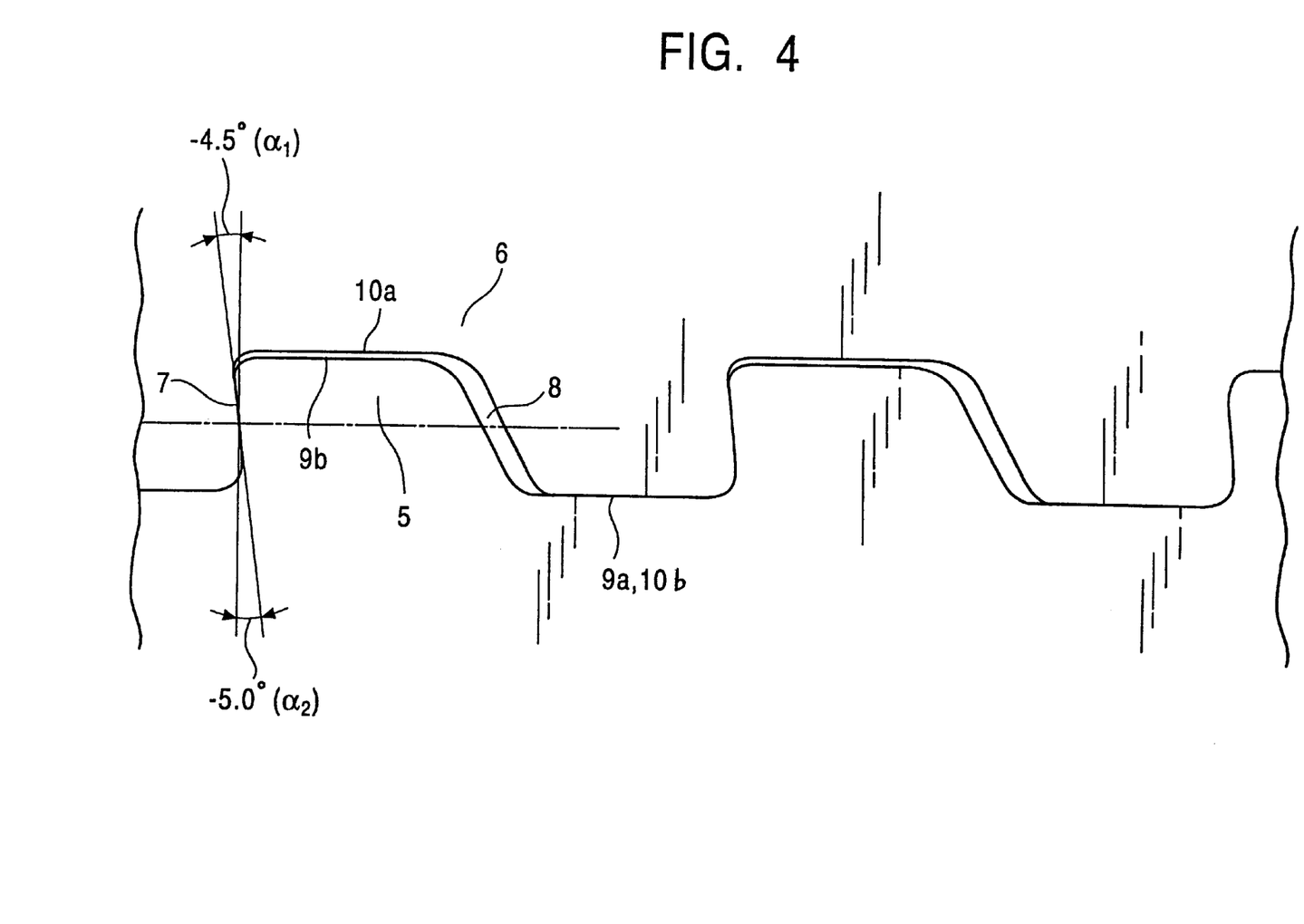
FIG. 4 is an enlarged cross-sectional view of a threaded section of an oil-country-tubular threaded joint according to the present invention.

FIG. 4 is an enlarged view of a threaded section of a threaded joint of the present invention. A load face 7 formed of a male screw thread 5 and a female screw thread 6 contact each other, and a clearance is formed in a portion of an insertion face 8. Also, a clearance is formed between a crest face 9b of the male screw thread 5 and a root face 10a of the female screw thread 6, and a root face 10b of the male screw thread 5 and a crest face 9a of the female screw thread 6 are in contact with each other.

In this embodiment, the load face 7 is arranged such that load flank angles α1 and α2 are different at an intermediate section of the thread, specifically, at an upper section and a lower section in an intermediate position in the height direction of the male screw thread 5 in the threaded section. In particular, the load flank angles of the load face 7 are arranged within a range of $-3°$ to $-25°$, with the upper load flank angle (α1) smaller than the lower load flank angle (α2) by 0.5° to 2.0°. This prevents angular portions of the threads from being damaged, realizing two-step reduction of load flank angles which has never been implemented before. The load flank angle of the female screw thread 5 is not formed in two steps and is $-5°$.

The load flank angles of the male screw thread 5 and the female screw thread 6 are arranged to be in the range of $-3°$ to $-25°$ in the present invention for the reasons that load flank angles smaller than $-3°$ causes problems in that the threads slip out, and load flank angles greater than $-25°$ cause problems in that crest sections of the load-flank face are damaged. The range of $-3°$ to $-15°$ is more preferable. Further, the range of $-3°$ to $-6°$ is more preferable.

Reasons for the arrangement in which the upper load flank angle (α1) of a male screw thread is smaller than the lower load flank angle (α2) by 0.5° to 2.0° are as follow. When the load flank angle is smaller then 0.5°, the threads cannot be cut with a thread-machining tool because of limited manufacturing tolerances. When the load flank angle is greater than 2.0°, the lower load flank angle causes excessively tight contact, which must be avoided.

Also, in the present invention, the clearance between insertion faces 8a and 8b is formed in a range of 0.05 to 0.25 mm. This increases the advantage of damage prevention. If the clearance is smaller than 0.05 mm, the faces 8a and 8b will contact because of tolerances for threads, therefore causing damage. If the clearance is greater than 0.25 mm, there is no advantage at compression.

Also, the inventor experimented with an arrangement in which the load flank angles α of a male screw thread are not different at an upper portion and a lower portion in an intermediate position, that is, at a single step of the load flank angles α.

Figure 5A:
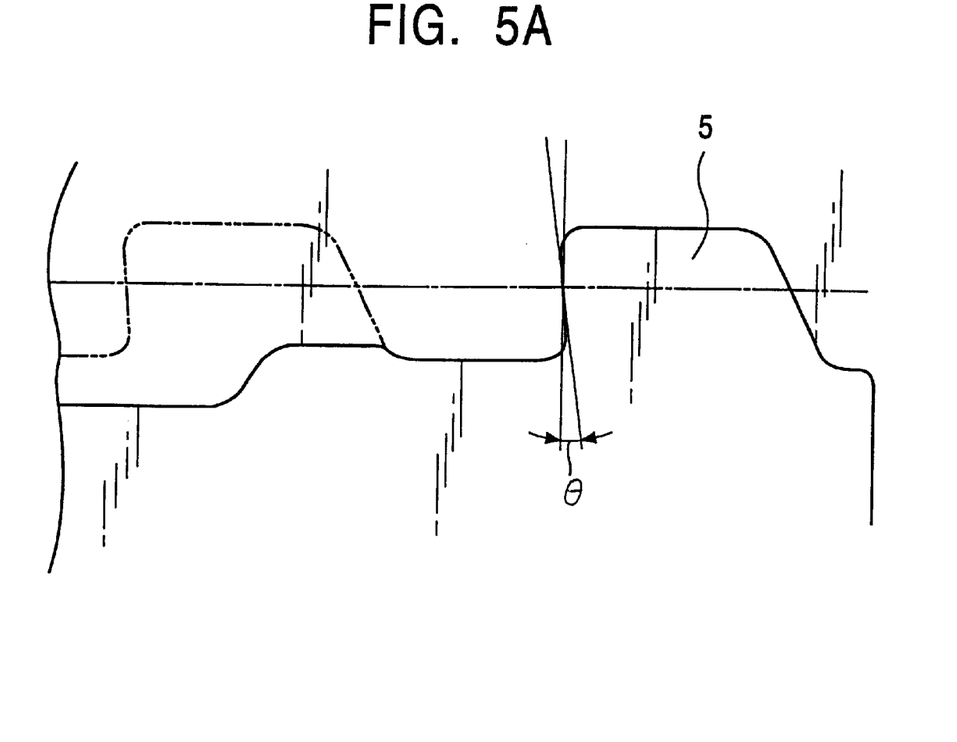
FIG. 5A is a cross-sectional view of a threaded section on the side of a female screw thread of the oil-country-tubular threaded joint according to the present invention.
Figure 5B:
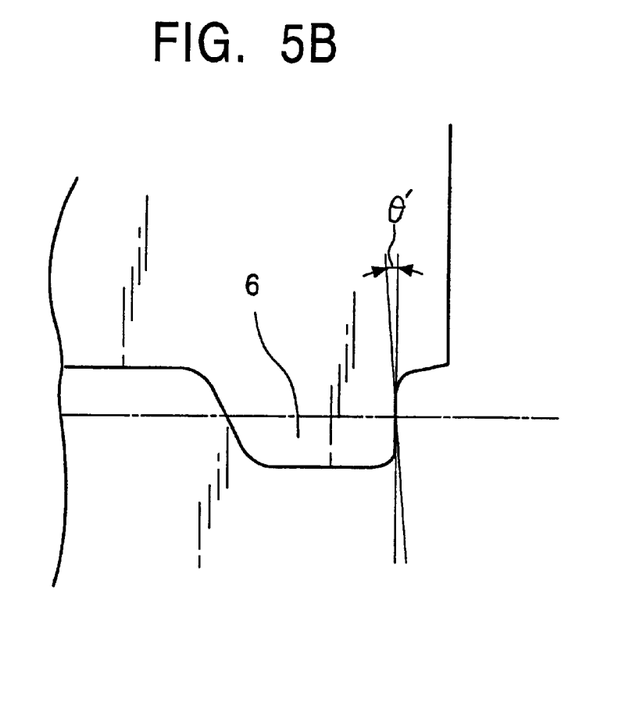
FIG. 5B is a cross-sectional view of a threaded section on the side of a male screw thread of the oil-country-tubular threaded joint according to the present invention (0>0')

In the experiment, the inventor determined whether a pin (male screw thread 5) and a coupling (female screw thread 6) made for the experiment, as shown in FIGS. 5A and 5B, can be used as an oil-country-tubular. As a result, when the load flank angles of the male screw thread 5 and the female screw thread 6 are arranged to be different from each other by 0.1° to 0.75°, substantially the same effects of damage prevention as in the case of the two-step load flank angles were confirmed to be producible.

In this case, a reason for the arrangement with the load flank angle difference of 0.1° to 0.75° is that an angle smaller than 0.1° does not produce a sufficient difference so as to produce the advantage of damage prevention, and the angle greater than 0.75° may cause a so-called "galling" on crest faces of threads. In the experiment, it was shown that either the load flank angle of the male screw thread or the female screw thread may be greater for producing the same effects.

EXAMPLE 1

As shown in FIGS. 1 and 2, threaded joints are provided on two ends of oil-country-tubulars 4 and a coupling 2 and they were coupled, and fluid leakage tests were performed therefor. Dimensions of the oil-country-tubulars 4 and the coupling 2 used in the tests are shown in Table 1.

TABLE 1

|  | Pin section of tube | Coupling |
|---|---|---|
| Length | 910 mm | 172.5 mm |
| Outer diameter | 88.9 mm | 98.5 mm |
| Wall thickness | 6.45 mm | N/A |
| Steel type | 13 Cr (80 KSi) | 13 Cr (80 KSi) |

Fluid leakage tests were also performed in an arrangement in which conventional threaded joints are coupled with the oil-country-tubulars 4 and the coupling 2. In the tests, high-pressure water and high pressure gas were used instead of crude oil and natural gas. Leakage evaluation was carried out in accordance with requirements stipulated in the A1 classification (highest) of the API standards. For load flank angles α and stubbing flank angles β of insertion faces and load faces of the joints, various combinations were tried in the tests.

Table 2 below shows the results of the tests.

TABLE 2

| | Load flank angle of male screw thread | | Load flank angle of male screw thread | Stubbing flank angle of male and female screw threads | Helium-leakage rate | Thread-crest damage rate |
|---|---|---|---|---|---|---|
| | $α_1$ | $α_2$ | (γ) | (β) | (%) | (%) |
| Example 1 | $-4.5°$ | $-5.0°$ | $-5.0°$ | 25° | 0 | 0 |
| Example 2 | $-4.5°$ | $-5.0°$ | $-5.0°$ | 15° | 0 | 0 |
| Example 3 | $-4.5°$ | $-4.5°$ | $-5.0°$ | 25° | 0 | 0 |
| Conventional Example 1 | $-3°$ | $-3°$ | $-3°$ | 10° | 4 | 8 |

As is apparent in Table 2 above, the results of the tests proved that no damage nor fluid leakage occurs on threaded joints according to the present invention in either case of two-step load flank angles (shown in FIG. 4) or of a single-step load flank angle (shown in FIG. 5). However, both damage and fluid leakage occurred in the conventional examples. In Table 2, the damage rate and the leakage rate individually represent occurrence rates in 50 joints of the oil-country-tubulars 4.

In the above example, threaded joints of a coupling type were used, but the present invention may of course be applied to threaded joints of an integral type.

(2) Thread-machining Method and Thread-machining Apparatus

Figure 6:
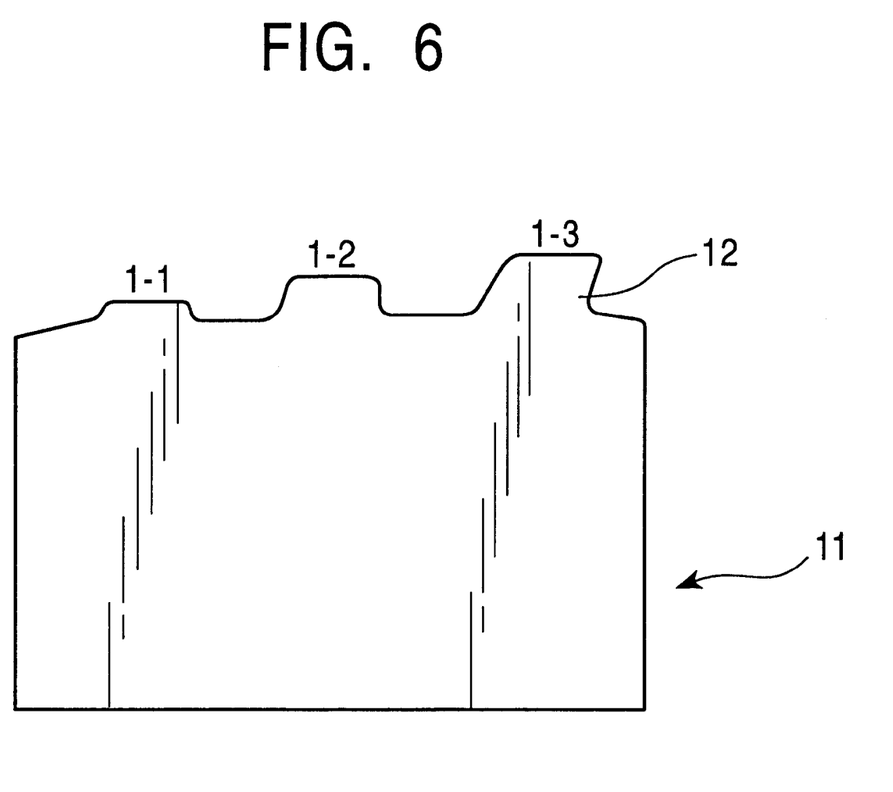
FIG. 6 is a cross-sectional view of an example of chasers used in a thread-machining apparatus of the present invention.

FIG. 6 shows a chaser 11 according to the present invention. As is apparent in the drawing, each of the chasers 11 has three cutting edges 12. In the present invention, two or more chasers 11 are used simultaneously to overcome the problems conventionally arising. In this connection, the inventor intended to vary the shape of cutting edges of the chaser 11 gradually to be suitable from the beginning to the end of thread-machining operation. That is, based on this idea, an arrangement has been made such as that the cutting edges 12 of different shapes are sequentially used during thread-machining operation, and differently shaped twelve cutting edges 12 are distributed to four chasers 11. Specifically, when the chaser 11 shown in FIG. 6 is the first chaser, the machining edge 12 (1-1) is used first, the machining edge 12 (1-2) is used fifth, and the machining edge 12 (1-3) is used ninth. For the second and other chasers 11, a manner similar to the above will allow the use-order individual cutting edges 12 to be easily identified. Therefore, when a tubular body 13 contacts a finally used machining edge 12 of the fourth chaser 11, one pitch of screw thread is formed around the tubular body 13.

Figure 7:
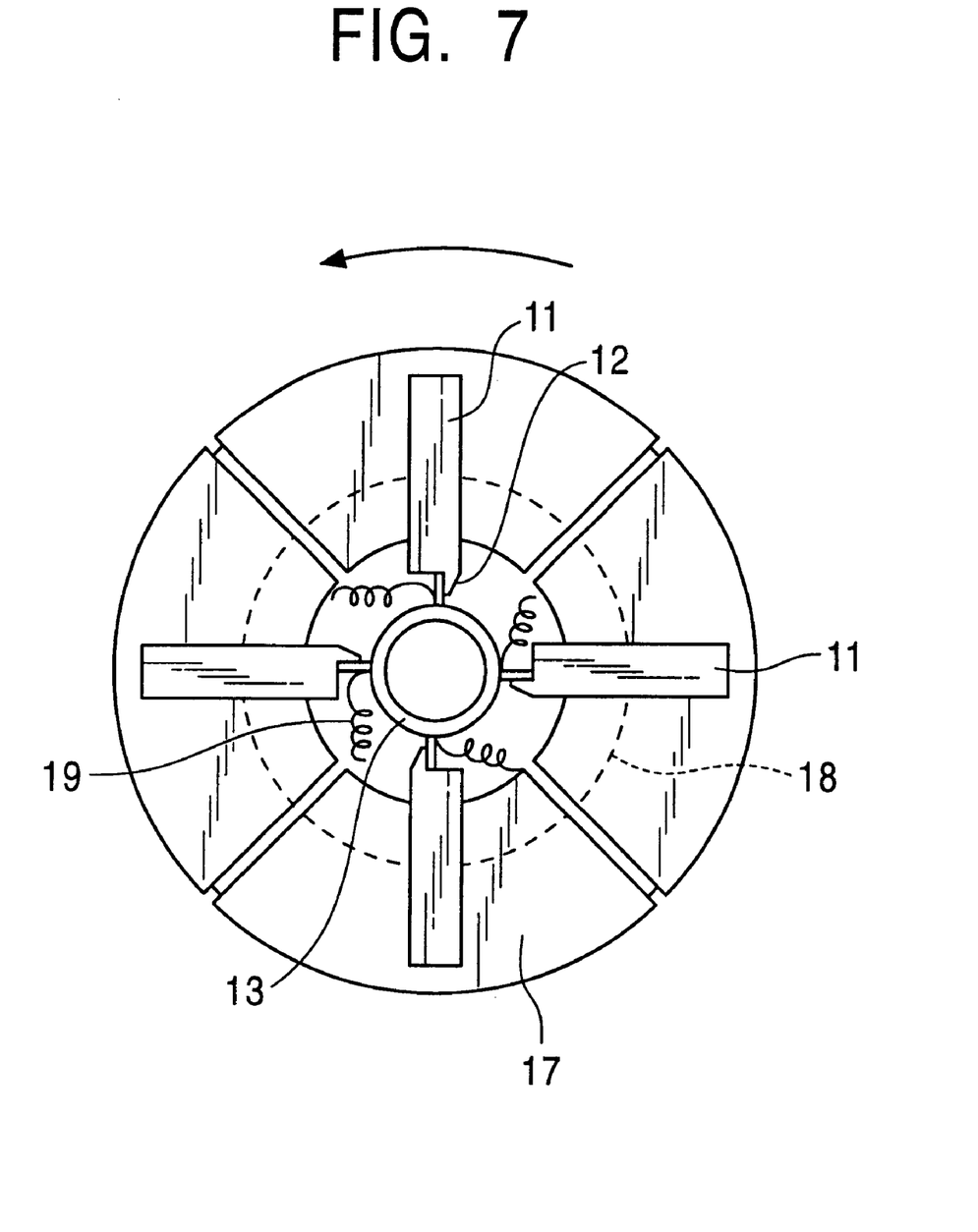
FIG. 7 is a plan view of the thread-machining apparatus in which the chasers are fitted onto a rotational body thereof.

Also, another arrangement is such that the four chasers 11 described above are installed together with a rotational body 17 in order to use the cutting edges 12 of the individual chasers 11 in the proper order from the beginning to the end in the thread machining operation. Ordinarily, the axis of the rotational body 17 is aligned with the axis of the tubular body 13, a thread-machining object, mounted and immobilized horizontally, the end faces being perpendicular to the axis of the tubular body 13.

As shown in FIG. 7, the four chasers 11 are individually installed on a concentric circle 18 so as to maintain angular pitches identical to each other in the rotational direction, that is, at pitches of 90°. In this case, care must be taken in that the chaser 11 having the machining edge 12 that is to first contact an interior surface of the tubular body 13 to be the first chaser 11 and the rest of chasers 11 are installed sequentially in the rotational direction so as to maintain the relationship of the cutting edges 12, as described above.

In this arrangement, since the tubular body 13 is the thread-machining object, the rotational body 17 has a moving means so as to be reciprocated in the direction of the tubular body 13. However, the moving means may be a well-known means, and a detailed description and a drawing therefore are omitted. Also, FIG. 7 shows an example case in which thread-machining is carried out on the exterior surface of the tubular body 13. However, there may be a case in which thread-machining is carried out on the interior surface of the tubular body 13 (coupling 2). In this case, the cutting edges 12 of the chasers 11 may be installed simply so as to be directed toward the exterior surface of the rotational body 17 so that the exterior surface is thereby pressed and thread-cut. Furthermore, in the present invention, the diameter of the concentric circle 18 is adjustable so that the same apparatus may be applicable to tubular bodies 13 of various diameters.

Accordingly, with the thread-machining apparatus as described above, when the rotational body 17 is rotated just one cycle, the four chasers 11 form one pitch of thread; when the rotational body 17 is fed by just a single pass in the axial direction of the tubular body 13, the number of threads required as one threaded joint is completed.

Although the above embodiment has been described with reference to the four chasers 11, there being no restrictions to the number, and three to six chasers 11 may preferably be used. Two or one chasers 11 may reduce the length of the service life, whereas seven or more chaser 11 may cause defective formation of screw thread crests. According to the number of chasers 11, the variation (shape) of the machining-edge relationship described above is of course reduced or increased.

Furthermore, experiments have proved that the individual chasers 11 may preferably have three cutting edges 12, but the number of cutting edges 12 may be in a range of one to five in the present invention.

EXAMPLE 2

For the tubular body 13, threaded-joint-forming pipes of 13-Cr steel and of various outside diameters were used, and female screw threads as described above were formed therein. The negative-value range of flank angles 15 was from −0.5° to −25°. At this time, the thread-machining method and the thread-machining apparatus of the present invention were applied, and in addition, threading-machining was carried out by using the conventional thread-machining apparatus described in the Related Art above. A rotational body in this case was fed at a rate of 5.08 mm per rotation.

As a result of the above applications of the thread-machining method and the thread-machining apparatus of the present invention, threads can be cut so as to be smooth by only one-pass feeding of the tubular body 13 into the apparatus, and threads of high quality can therefore be cut without uneven pitches being produced. Also, thread-machining time for the joints of any of the diameters can be reduced by a rate of ⅓ to ¼, compared with that in the conventional case. According to these results, productivity of the joints threaded inside and having improved fluid leakage control characteristics, which is a primary concern with threaded joints, can be improved significantly, compared with those in conventional cases.

INDUSTRIAL APPLICABILITY

The present invention provides an oil-country-tubular threaded joint that can withstand tensile forces, and in addition, other forces such as compression and bending forces, thus producing highly improved characteristics in regard to the prevention of fluid leakage.

Also, the present invention provides a thread-machining method and a thread-machining apparatus for the oil-country-tubular threaded joint which allow negative screw threads of a higher quality level than that of conventional cases in reduced time.

What is claimed is:

1. An oil-country-tubular threaded joint having a male screw thread and a female screw thread, comprising a load face formed of the male screw thread and the female screw thread having load flank angles of negative values over an entire contact surface of the load face, wherein the load flank angles are varied at a position at which the load face is divided in the height direction of the male screw thread into an upper side and a lower side so that an upper load flank angle is smaller than a lower load flank angle.

2. An oil-country-tubular threaded joint as claimed in claim 1, comprising the load face formed of the male screw thread and the female screw thread which have load flank angles in a range of −3° to −25°, wherein the upper load flank angle is smaller than the lower load flank angle by 0.5° to 2.0°.

3. An oil-country-tubular threaded joint as claimed in claim 2, wherein an insertion face formed of the male screw thread and the female screw thread are not in contact with each other.

4. An oil-country-tubular threaded joint as claimed in claim 3, comprising a clearance of 0.05 mm to 0.25 mm between the insertion f ace of the male screw thread and the female screw thread.

* * * * *